United States Patent
Cohen et al.

(10) Patent No.: US 10,480,728 B2
(45) Date of Patent: *Nov. 19, 2019

(54) ELECTRICAL COVER WITH CONCENTRIC REMOVABLE ANNULAR RINGS

(71) Applicant: 2BR Creations, LLC, Evans, CO (US)

(72) Inventors: Bradley Cohen, Evans, CO (US); Brian Neece, Windsor, CO (US)

(73) Assignee: 2BR Creations, LLC, Evans, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/177,259

(22) Filed: Oct. 31, 2018

(65) Prior Publication Data

US 2019/0072248 A1    Mar. 7, 2019

Related U.S. Application Data

(63) Continuation of application No. 15/587,397, filed on May 4, 2017, now Pat. No. 10,125,930.

(Continued)

(51) Int. Cl.
| | |
|---|---|
| *F21S 8/02* | (2006.01) |
| *H02G 3/08* | (2006.01) |
| *H01R 13/447* | (2006.01) |
| *H02G 3/14* | (2006.01) |
| *H01H 21/08* | (2006.01) |
| *B05B 12/24* | (2018.01) |

(Continued)

(52) U.S. Cl.
CPC ............... *F21S 8/02* (2013.01); *B05B 12/24* (2018.02); *B05B 12/26* (2018.02); *B05B 12/29* (2018.02); *F21S 8/026* (2013.01); *H01H 21/08* (2013.01); *H01H 29/08* (2013.01); *H01R 13/447* (2013.01); *H02G 3/088* (2013.01); *H02G 3/14* (2013.01); *F21V 17/002* (2013.01); *H01R 13/44* (2013.01); *H02G 3/02* (2013.01)

(58) Field of Classification Search
CPC .. F21S 8/02; F21S 8/026; H01R 13/44; H01R 13/443; H01R 13/453; H01R 13/4532; H01R 13/4534; H01R 13/4536; H01R 13/4538
See application file for complete search history.

(56) References Cited

U.S. PATENT DOCUMENTS 4,475,147 A    10/1984 Kristofek
9,239,162 B2 *  1/2016 Sawarynski, Jr. .... F21V 31/005

OTHER PUBLICATIONS

U.S. Appl. No. 15/587,397, filed May 4, 2017.
U.S. Appl. No. 62/331,962, filed May 4, 2016.

* cited by examiner

*Primary Examiner* — Robert J May
(74) *Attorney, Agent, or Firm* — Craig R. Miles; CR Miles P.C.

(57) ABSTRACT

The electrical cover comprises a friction-held electrical cover for a recessed light fixture. Embodiments of the electrical cover described herein provide flexible finish material covers that guard recessed "can" light fixtures from paint, spackling, and other foreign materials. The frictionally-held finish material covers utilize specifically shaped features on the surfaces, such as negative draft, that contact the electrical components to increase the hold on the electrical device. Some of the shaped features of the frictionally-held covers also help minimize stress in the cover. Features are also molded into the parts to assist and strengthen the cover once installed, and thus protect against the intrusion of finish material behind the cover.

20 Claims, 5 Drawing Sheets

Related U.S. Application Data

(60) Provisional application No. 62/331,962, filed on May 4, 2016.

(51) Int. Cl.
    *B05B 12/20*     (2018.01)
    *B05B 12/26*     (2018.01)
    *H01H 29/08*     (2006.01)
    H02G 3/02     (2006.01)
    H01R 13/44     (2006.01)
    F21V 17/00     (2006.01)

ELECTRICAL COVER WITH CONCENTRIC REMOVABLE ANNULAR RINGS

CROSS-REFERENCE TO RELATED APPLICATIONS

This United States Patent Application is a continuation of U.S. patent application Ser. No. 15/587,397, filed May 4, 2017, now U.S. Pat. No. 10,125,930, issued Nov. 13, 2018, which claims the benefit of U.S. Provisional Patent Application 62/331,962, filed May 4, 2016, each hereby incorporated by reference herein.

TECHNICAL FIELD

The invention relates generally to the field of commercial and residential electrical construction; and more particularly, to the field of preparing electrical wiring components prior to painting/texturing or otherwise finishing surrounding surfaces; and more particularly still, to electrical covers designed to fit over one or more electrical recessed light fixtures to protect said component during painting/texturing/finishing processes.

BACKGROUND

There are many products designed to cover and/or protect recessed light fixtures (hereinafter, "electrical components") from receiving paint, texture, or other finishing materials (collectively, "finish materials") during finishing projects. This is important as such materials can enter electrical components and cause malfunctions, be unsightly, reduce functionality, or even create electrical wiring hazards. In such situations, removing materials from electrical components can be time consuming and difficult; it is a much better approach to keep such materials from entering the electrical components in the first place. One common partial solution is to tape over the electrical components before commencing finish work. However, this is a laborious and time consuming process that ultimately yields unimpressive results as the gaps between rows or columns of tape allow materials to enter the electrical components. Furthermore, during the taping process, it is easy to accidentally make contact with the interior of the electrical components leading to potential electrical shock hazards. Tape is not reusable and often lets loose or fails when touched, vibrated, or otherwise moved—simple exposure to sunlight can also cause tape to fail. Not to mention the unsightly residue that tape often leaves behind. The prior art has seen the shortcomings of tape and attempted to address them with plastic paint shields. However, most such shields utilize prongs that either project into the outlets or into the electrical boxes. Many modern outlets have safety tabs that defeat insertion of such prongs causing such paint shields to be unusable. Further, depending on the installation of electrical components, there may be no room for insertion prongs to fit into an electrical box to the side of switches or outlets. Again, failure of such paint shields results. Additional problems with prior art paint shields is that they are flat, flimsy and prone to cracking, so they often gap or buckle, leaving spaces through which finish materials can enter. Thicker, more rigid shields fail to account for variations in manufacturing tolerances between electrical components, so may not fit all electrical components. What is needed is an electrical cover that is able to be pressure-fit so that no insertion prongs are necessary, and is easy to quickly add or remove in order to save labor during finishing projects.

SUMMARY

The electrical cover comprises a friction-held recessed light fixture cover. Embodiments of the electrical cover described herein provide flexible finish material covers that guard recessed "can" light fixtures from paint, spackling, and other foreign materials. The frictionally-held finish material covers utilize specifically shaped features on the surfaces, such as negative draft, that contact the electrical components to increase the hold on the electrical device. Some of the shaped features of the frictionally-held covers also help minimize stress in the cover. Features are also molded into the parts to assist and strengthen the cover once installed, and thus protect against the intrusion of finish material behind the cover.

The above summary provides a basic understanding of some aspects of the specification. This summary is not an extensive overview of the specification. It is intended to neither identify key or critical elements of the specification nor delineate any scope of particular embodiments of the specification, or any scope of the claims. Its sole purpose is to present some initial concepts in a simplified form as a prelude to the more detailed description that is presented later.

BRIEF DESCRIPTION OF THE DRAWINGS

The aforementioned and other features and objects of the present invention and the manner of attaining them will become more apparent and the invention itself will be best understood by reference to the following descriptions of a preferred embodiment and other embodiments taken in conjunction with the accompanying drawings, wherein.

DETAILED DESCRIPTION

Figure 1:
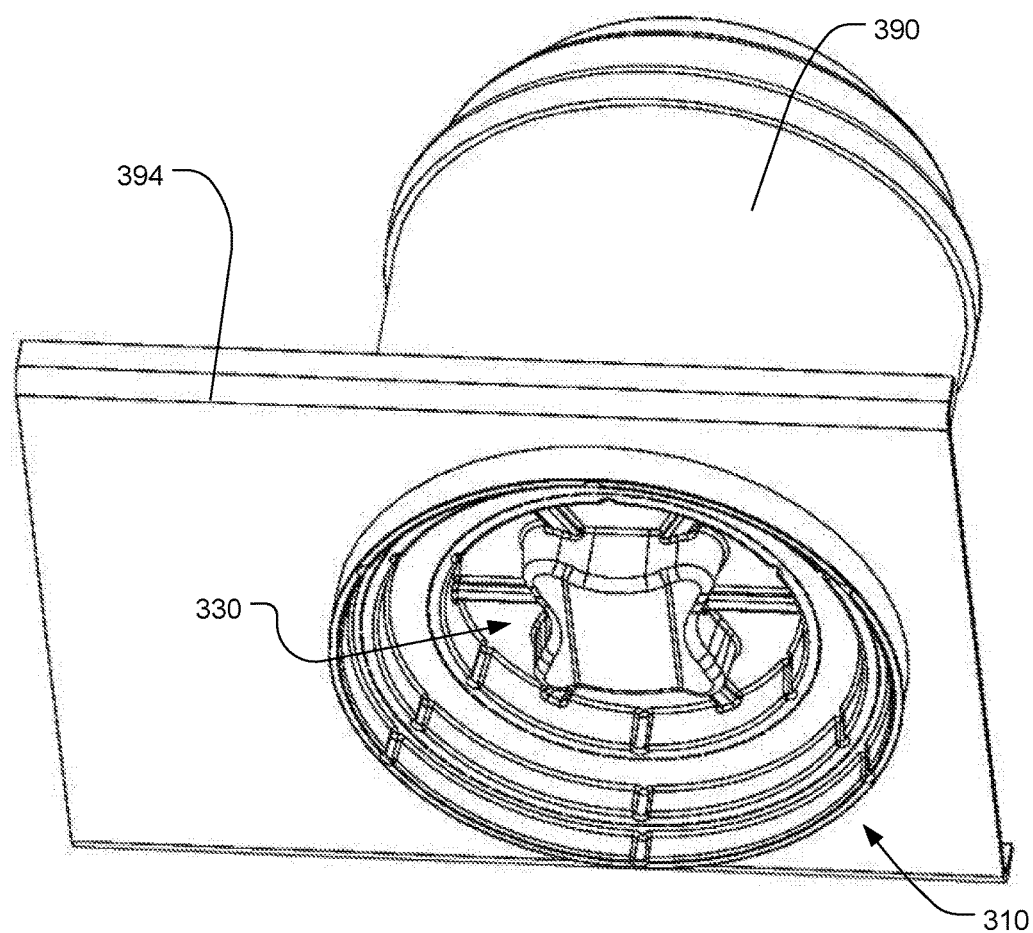
FIG. 1 illustrates a bottom perspective view of an exemplary embodiment of an electrical cover in place on a recessed light fixture.

In the following discussion, numerous specific details are set forth to provide a thorough understanding of the present disclosure. However, those skilled in the art will appreciate that embodiments may be practiced without such specific details. Furthermore, lists and/or examples are often provided and should be interpreted as exemplary only and in no way limiting embodiments to only those examples. Similarly, in this disclosure, language such as "could, should, may, might, must, have to, can, would, need to, is, is not", etc. and all such similar language shall be considered interchangeable whenever possible such that the scope of the invention is not unduly limited. For example, a comment such as: "item X is used" can be interpreted to read "item X can be used".

Exemplary embodiments are described below in the accompanying Figures. The following detailed description provides a review of the drawing Figures in order to provide an understanding of, and an enabling description for, these embodiments. One having ordinary skill in the art will understand that in some cases well-known structures and functions have not been shown or described in detail to avoid unnecessarily obscuring the description of the embodiments. Further, examples described herein are intended to aid in understanding the principles of the embodiments, and are to be construed as being without limitation to such specifically recited examples and conditions. As a result, the inventive concepts are not limited to the specific embodiments or examples.

Referring now to the drawings, FIG. 1 illustrates a bottom perspective view of an exemplary embodiment of an electrical cover 310 in place on a recessed light fixture 390. The recessed light fixture 390 includes a recessed light fixture assembly 394 in the illustration in FIG. 1. The electrical cover 310 in this embodiment is illustrated as being transparent, other embodiments may utilize translucent and/or opaque components.

In the embodiment illustrated in FIG. 1, a electrical cover 310 comprises a main body having a series of concentric annular fittings that allow the electrical cover 310 to mate to various sized openings of the various sizes of recessed light fixtures 390. Note the plurality of scored cut-lines 320 and 322 shown in later figures; these provide cut-lines for removal of larger diameter concentric annular fittings when the small or medium size recessed light fixture is encountered. When using the electrical cover 310 with the large size, no cutting or removal is needed as the excess smaller concentric annular fittings simply fit inside the larger recessed light fixture.

Unlike the plurality of fasteners holding the electrical box cover in place, the electrical cover utilizes a pressure-fit inside the opening of the recessed light fixture. In order to adjust for slight differences in manufacturing tolerances, the concentric annular fittings incorporate a plurality of alignment features (see later FIGs.) that allow the fittings to match the various diameters of recessed light fixtures.

Note that as the electrical cover 310 is pressed into the recessed light fixture, the outer rim of the electrical cover is pressed approximately flat against the mounting surface so that no gaps are available through which finish materials can enter the recessed light fixture. The electrical covers protect not only the recessed light fixture itself, but associated wiring, wiring connections, and the walling materials (e.g., drywall) that surround the perimeter of the recessed light fixture. The electrical covers shield the electrical components from paint and/or other surface finishing materials such as plastering or spackling that is sprayed and/or rolled onto a wall surface or surface finishing treatments such as grouting tiles. The electrical covers may be reused, and may be washable or disposable. The electrical covers can be fabricated from a low-cost thermally formed polymer plastic. The covers can utilize negatively drafted contact surfaces to improve the overlapping friction holding force while minimizing material stress.

An arched surface formed into the center of the recessed light fixture grip handle 330 improves the strength of the recessed light fixture grip handle 330 while improving the flexibility thereof as well. Rounded surfaces are designed into the covers to minimize the risk of cracking, make the electrical covers easier to form during fabrication, and improve the electrical covers' life-cycle for reusability.

Figure 2:
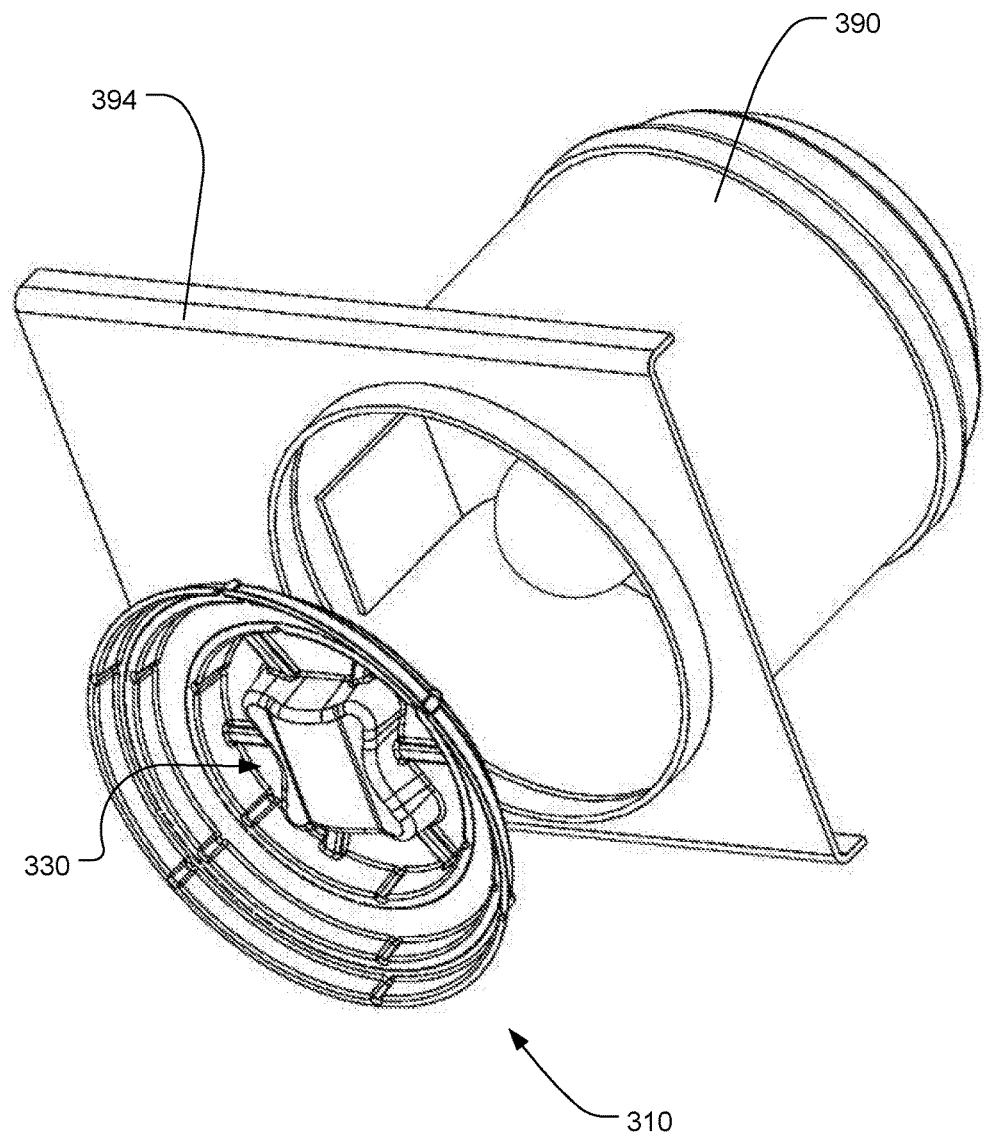
FIG. 2 illustrates a bottom perspective view of an exemplary embodiment of an electrical cover being emplaced within a recessed light fixture.

FIG. 2 illustrates a bottom perspective view of an exemplary embodiment of an electrical cover 310 being emplaced within a recessed light fixture. Note that this view helps to show the electrical cover in relation to the electrical components it is protecting.

Figure 3:
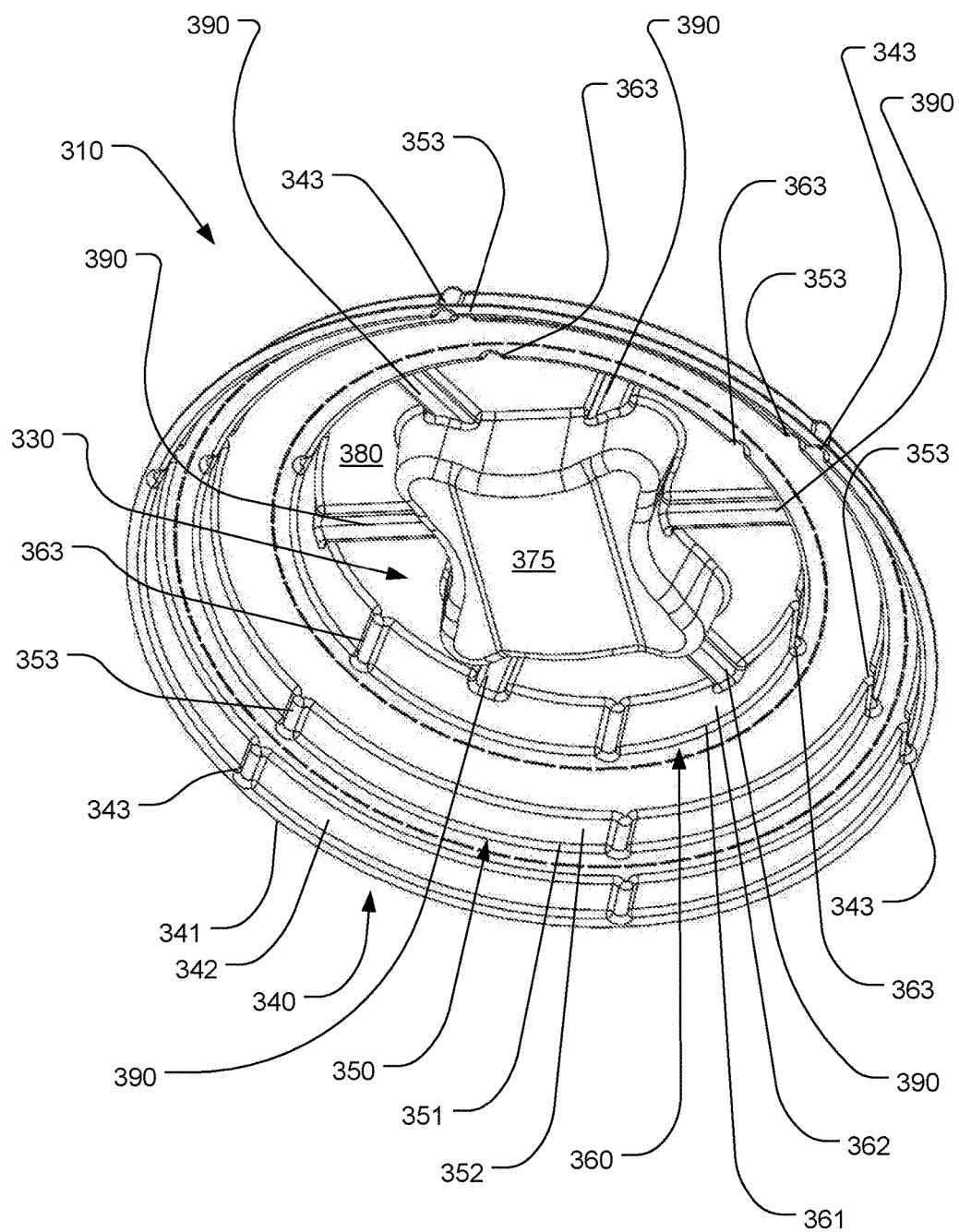
FIG. 3 illustrates a bottom perspective view of an exemplary embodiment of an electrical cover.

FIG. 3 illustrates a bottom perspective view of an exemplary embodiment of an electrical cover 310. The cover comprises a series of concentric annular fittings 340, 350, and 360 which allow the electrical cover 310 to mate to various sized openings of the various sizes of recessed light fixtures 390. Each of the fittings 340, 350 and 360 have an outer rim 341, 351, and 361 (respectively), and a sidewall 342, 352, and 362. Additionally, each fitting has a plurality of alignment features 343, 353, and 363 that align the sidewall with the interior of the recessed light fixture and provide for spacing/room to accommodate various size differences in the recessed light fixture openings due to manufacturing tolerances, etc. Additional slight angling of the sidewalls 342, 352, and 362 works in concert with the alignment features to ensure that the electrical cover 310 can fit almost any recessed light fixture.

Note that as the electrical cover 310 is pressed into the recessed light fixture, the outer rim of the electrical cover is pressed approximately flat against the mounting surface so that no gaps are available through which finish materials can enter the recessed light fixture. This is true regardless of whether the small, medium, or large concentric annular fittings 340, 350, and 360 are used. In the embodiment illustrated in FIG. 3, three sizes of fittings are illustrated. In other embodiments, the number can be one, two, three, four, or more.

On the rear wall 380 of the electrical cover 310 is a grip handle 330. It can incorporate an arched surface 375 that strengthens resistance against grasping and deforming the interior walls of the grip handle 330 while providing flexibility as well. It is preferable that the grip handle 330 extends outwards/forwards from the rear wall, but in alternate embodiments, the grip handle 330 can be inset/rear extending.

A plurality of support ridges 390 can strengthen and keep the electrical cover rigid.

Figure 4:
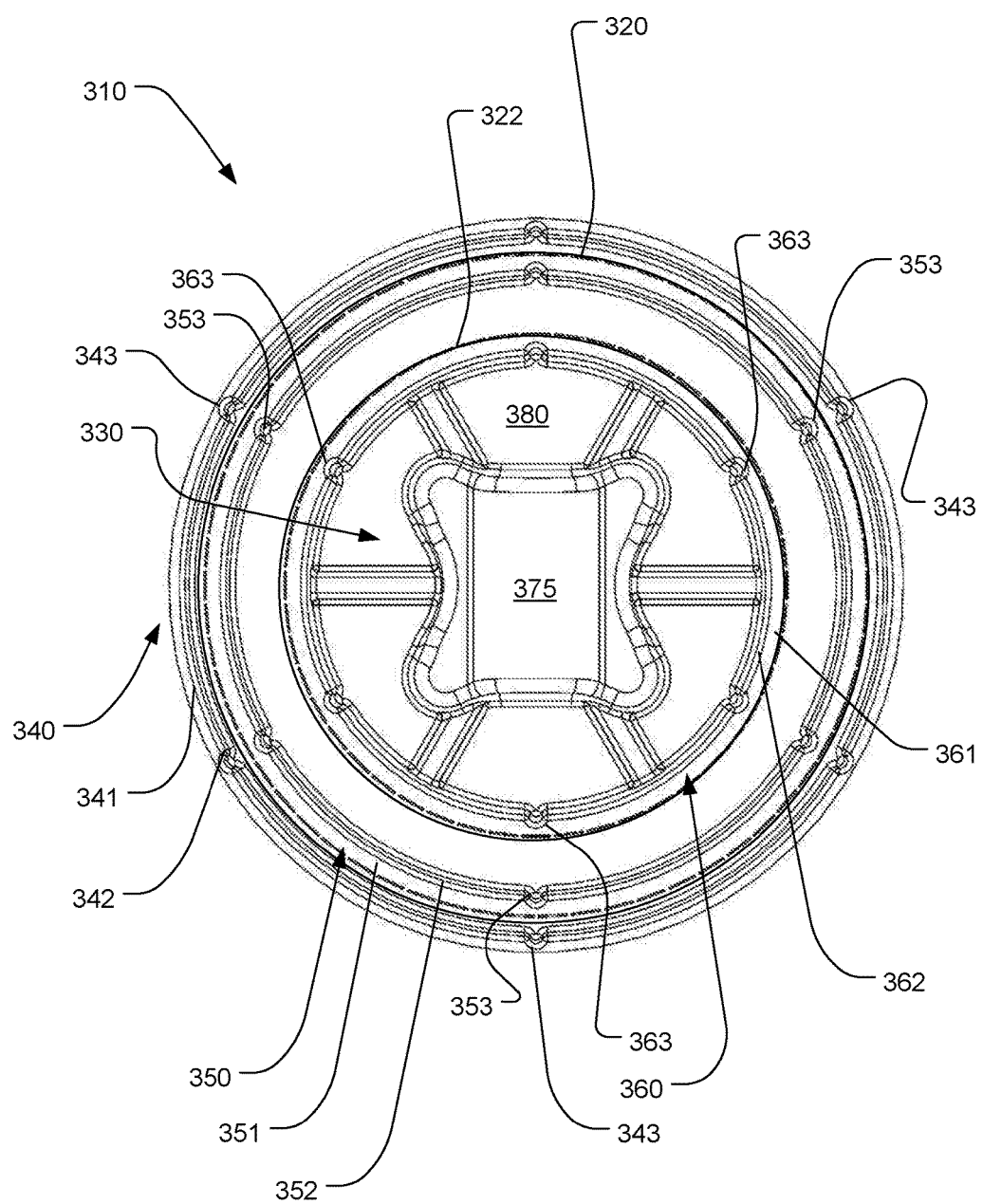
FIG. 4 illustrates a bottom plan view of an exemplary embodiment of an electrical cover.

FIG. 4 illustrates a bottom plan view of an exemplary embodiment of an electrical cover 310. In addition to all the subcomponents discussed above, FIG. 4 highlights the plurality of scored cut-lines 322 and 320 extending around beyond the perimeters of the small concentric annular fitting rim 361 and the medium concentric annular fitting rim 351. The cut-lines 320 and 322 provide a simple guide for the user to cut away excess materials when using the electrical covers 310 on small and medium recessed light fixtures. In other embodiments, the scored cut-lines 320 and 322 can be deep enough that a user can simply snap off the excess rather than requiring cutting.

The electrical cover 310 is designed with pressure points that allow the user to grasp and easily engage/disengage the electrical cover from a recessed light fixture. In FIG. 4, these pressure points comprise the plurality of finger holds within the grip handle 330. By squeezing at these points, the user can easily grasp and hold the electrical cover without covering his or her fingers with paint or other finish material that may have been inadvertently applied to the rims of the cover. Squeezing the grip handle 330 pulls the can cover 310 towards the center and relieves some of the pressure fit tension between the cover and the can in which the cover is mated. As noted above, the cover may utilize surfaces that are negatively drafted relative to other drafted features on the surfaces that contact the electrical device to increase the overlap and help minimize stress in the cover.

Figure 5:
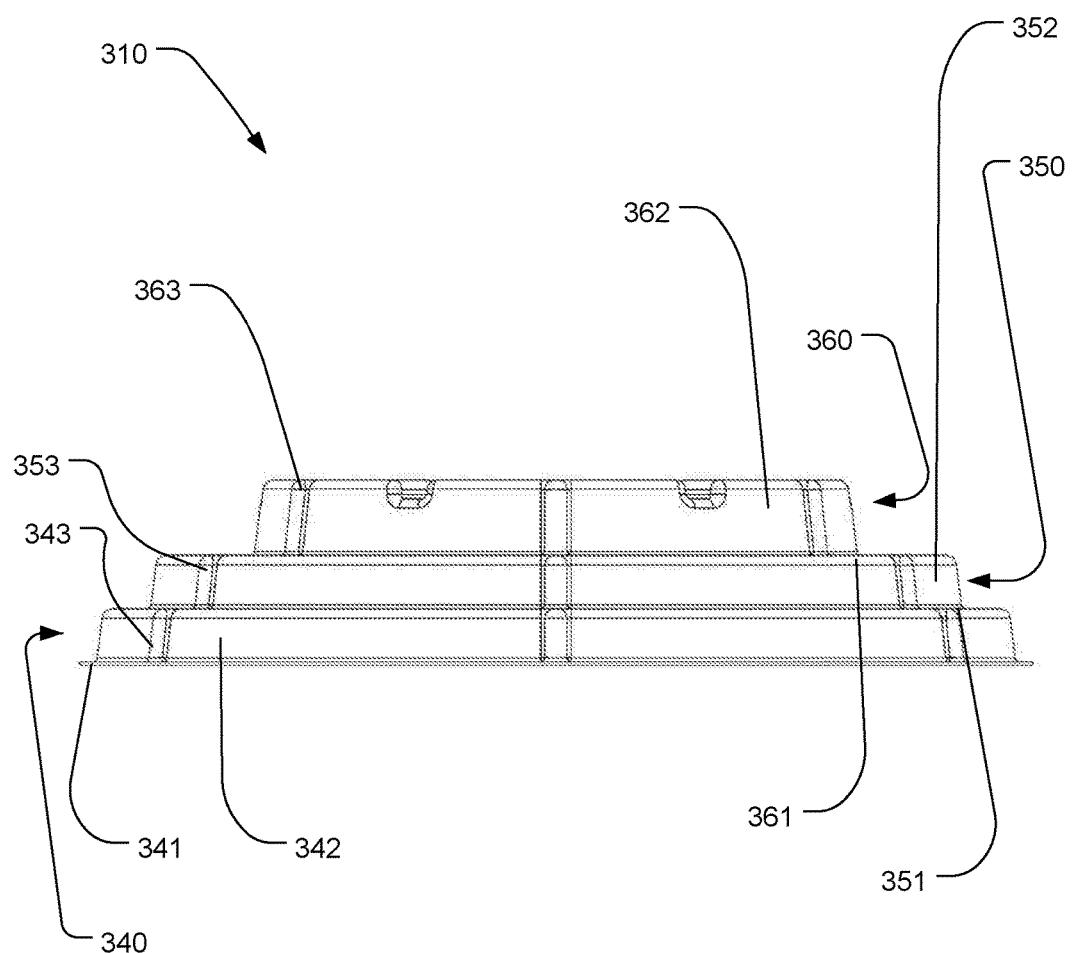
FIG. 5 illustrates a side elevation view of an exemplary embodiment of an electrical cover.

FIG. 5 illustrates a side elevation view of an exemplary embodiment of an electrical cover 310. Note the slight angle to each of the sidewalls 340, 350, and 360 that help the cover fit into the various sized recessed light fixtures. The relatively small size of the rims 341, 351, and 361 is also apparent in FIG. 5. The perimeter of the electrical cover rim is approximately flattened against the installation surface (wall, recessed light fixture assembly, box, etc.) once installed, thereby minimizing gaps between the rim and the installation surfaces.

While particular embodiments have been described and disclosed in the present application, it is clear that any number of permutations, modifications, or embodiments may be made without departing from the spirit and the scope of this disclosure. Particular terminology used when describing certain features or aspects of the embodiments should not be taken to imply that the terminology is being redefined herein to be restricted to any specific characteristics, features, or aspects with which that terminology is associated. In general, the application should not be construed to be limited to the specific embodiments disclosed in the specification, unless the above Detailed Description section explicitly defines such terms. Accordingly, the actual scope of the inventions encompasses not only the disclosed embodiments, but also all equivalent ways of practicing or implementing the claimed subject matter.

The above detailed description of the embodiments is not intended to be exhaustive or to limit the disclosure to the precise embodiment or form disclosed herein or to the particular fields of usage mentioned above. While specific embodiments and examples are described above for illustrative purposes, various equivalent modifications are possible within the scope of the disclosure, as those skilled in the relevant art will recognize. Also, the teachings of the embodiments provided herein can be applied to other systems, not necessarily the system described above. The elements and acts of the various embodiments described above can be combined to provide further embodiments.

Any patents, applications and other references that may be listed in accompanying or subsequent filing papers, are incorporated herein by reference. Aspects of embodiments can be modified, if necessary, to employ the systems, functions, and concepts of the various references to provide yet further embodiments.

In light of the above "Detailed Description," the Inventors may make changes to the disclosure. While the detailed description outlines possible embodiments and discloses the best mode contemplated, no matter how detailed the above appears in text, embodiments may be practiced in a myriad of ways. Thus, implementation details may vary considerably while still being encompassed by the spirit of the embodiments as disclosed by the inventor. As discussed herein, specific terminology used when describing certain features or aspects should not be taken to imply that the terminology is being redefined herein to be restricted to any specific characteristics, features, or aspects of the embodiments with which that terminology is associated.

The above specification, examples and data provide a description of the structure and use of exemplary implementations of the described systems, articles of manufacture and methods. It is important to note that many implementations can be made without departing from the spirit and scope of the disclosure.

We claim:

1. An electrical cover for a recessed light fixture, comprising:
   a main body having a series of concentric annular fittings increasing in diameter, wherein at least one of said series of concentric annular fittings capable of pressure fit engagement with an opening of a recessed light fixture; and
   a plurality of scored cut-lines, each of said plurality of scored-cut lines corresponding to each of said series of concentric annular fittings which allow removal of larger diameter concentric annular fittings.

2. The electrical cover of claim 1, further comprising a concentric annular fitting rim outwardly extending from each of said series of concentric annular fittings.

3. The electrical cover of claim 2, wherein said concentric annular fitting rim outwardly extends between a concentric annular fitting sidewall and each of said plurality of scored-cut lines.

4. The electrical cover of claim 3, wherein said plurality of scored cut-lines allow snap-off or cutaway of larger diameter concentric annular fittings.

5. The electrical cover of claim 1, further comprising a plurality of alignment features disposed on each of said series of concentric annular fittings.

6. The electrical cover of claim 5, wherein each of said series of concentric annular fittings has an angled sidewall.

7. The electrical cover of claim 1, further comprising a grip handle extending from a rear wall of said main body.

8. The electrical cover of claim 7, further comprising finger holds disposed on said grip handle, wherein squeezing said pair of finger holds relieves pressure fit engagement with said opening of said recessed light fixture.

9. The electrical cover of claim 8, further comprising an arched surface disposed on said grip handle between said finger holds.

10. The electrical cover of claim 9, further comprising a plurality of support ridges disposed on said rear wall of said main body.

11. The method of claim 1, further comprising extending a concentric annular fitting rim outward from each of said series of concentric annular fittings.

12. The method of claim 11, further comprising extending said concentric annular fitting rim between a concentric annular fitting sidewall and each of said plurality of scored-cut lines.

13. The method of claim 12, further comprising disposing said plurality of scored cut-lines at a depth in said main body to allow snap-off or cutaway of larger diameter concentric annular fittings.

14. The method of claim 11, further comprising disposing a plurality of support ridges on said rear wall of said main body.

15. A method in an electrical cover for a recessed light fixture, comprising:
   forming a main body having a series of concentric annular fittings increasing in diameter, wherein at least one of said series of concentric annular fittings capable of pressure fit engagement with an opening of a recessed light fixture; and
   concentrically disposing a plurality of scored cut-lines about each of said series of concentric annular fittings which allow removal of larger diameter concentric annular fittings.

16. The method of claim 15, further comprising disposing a plurality of alignment features on each of said series of concentric annular fittings.

17. The method of claim 15, further comprising angling a sidewall of each of said series of concentric annular fittings.

18. The method of claim 15, further comprising extending a grip handle from a rear wall of said main body.

19. The method of claim 18, further comprising disposing finger holds on said grip handle, wherein squeezing said pair of finger holds contracts said main body to relieve pressure fit engagement with said opening of said recessed light fixture.

20. The method of claim 19, further comprising disposing an arched surface on said grip handle between said finger holds.

\* \* \* \* \*